United States Patent
Hammons, Jr. et al.

(10) Patent No.: US 6,438,121 B1
(45) Date of Patent: Aug. 20, 2002

(54) RECOGNITION AND UTILIZATION OF AUXILIARY ERROR CONTROL TRANSMISSIONS

(75) Inventors: A. Roger Hammons, Jr., North Potomac; Ernest Yeh, Gaithersburg, both of MD (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/216,108

(22) Filed: Dec. 18, 1998

Related U.S. Application Data
(60) Provisional application No. 60/068,215, filed on Dec. 19, 1997.

(51) Int. Cl.[7] .................................................. H04J 3/00
(52) U.S. Cl. ....................................... 370/345; 370/498
(58) Field of Search .......................... 370/345, 347–348, 370/437, 458, 468, 498, 522, 527–529; 714/746, 774, 776, 796

(56) References Cited

U.S. PATENT DOCUMENTS

| | | | | |
|---|---|---|---|---|
| 3,564,144 A | * | 2/1971 | Diggelmann et al. | 370/468 |
| 5,818,829 A | * | 10/1998 | Raith et al. | 370/347 |
| 6,209,116 B1 | * | 3/2001 | Hammons et al. | 714/786 |
| 6,337,855 B1 | * | 1/2002 | Malkamaki | 370/347 |

* cited by examiner

Primary Examiner—Kwang Bin Yao
Assistant Examiner—Kevin C. Harper
(74) Attorney, Agent, or Firm—John T. Whelan; Michael W. Sales

(57) ABSTRACT

A method and apparatus for determining if useful auxiliary information in an auxiliary time slot is available for subscriber unit use. The present invention includes a receiver that receives data from both an auxiliary time slot and a dedicated time slot. Data from the receiver is coupled to a computation function that calculates a metric comparing the data from the auxiliary time slot and the dedicated time slot. The calculated metric is coupled to a threshold comparator that compares the calculated metric to a threshold. Based on the results of the comparison, a determination is made on the presence or absence of useful auxiliary data in an auxiliary time slot.

44 Claims, 7 Drawing Sheets

Unequal Protection
Class 1a - Protected by CRC and Convolutional Code
Class 1b - Protected by Convolutional Code
Class 2 - Unprotected

RECOGNITION AND UTILIZATION OF AUXILIARY ERROR CONTROL TRANSMISSIONS

RELATED APPLICATIONS

This application claims priority from U.S. Provisional application Ser. No. 60/068,215, filed Dec. 19, 1997.

BACKGROUND OF THE INVENTION (a) Field of the Invention

The present invention relates generally to communication systems and, more particularly, to an adaptable redundancy scheme, or overlay, for use in communication systems that use forward error correction (FEC) schemes. The present invention also relates to the automatic detection of the use of the redundancy scheme by subscriber units.

(b) Description of Related Art

Many digital cellular systems break time into a number of slots and transmit information in each time slot. For example, a cellular system may break time into six slots, with a different subscriber unit assigned to communicate with a cellular base station during each one of the time slots. The cellular base station may communicate with a first user during a first dedicated time slot, a second user during a second dedicated time slot, and so on for each time slot. After communication is made on the last time slot, the cycle is repeated and communication is made on the first time slot. However, not all of the time slots allocated to subscribers are completely filled with digital communication signals and, therefore, valuable communication time is wasted. This cellular communications configuration, where time is multiplexed between numerous users, is typically referred to as a time division multiple access (TDMA) system. TDMA systems typically use some form of Forward Error Correction (FEC) to minimize the number of communication errors in the system, thereby, improving the communication quality of the system.

Standard IS-136 is the current digital cellular standard used for TDMA systems. FIG. 1 is a diagram showing the FEC scheme for an IS-136 TDMA digital cellular system that uses trellis coding. The IS-136 system includes a speech coder 50 coupled to an IS-136 FEC coder 51, which includes a 7-bit Cyclic Redundency Check (CRC) computation function 52, a rate ½ convolutional coder 54, a puncturing function 56, a voice cipher 58, and a 2-slot interleaver 60. The speech coder 50 processes analog voice signals into digital data or bits. The IS-136 FEC scheme uses unequal protection of the speech coder 50 output bits to reduce communication errors. Bits from the speech coder 50 are classified into three distinct categories. The speech coder 50 outputs 48 class Ia bits, which are passed to both the CRC computation function 52 and the rate ½ convolutional coder 54. Although a speech coder 50 is disclosed, any digital data source may be used. The class Ia bits, which are the 48 most perceptually significant bits in terms of voice quality, are protected by a 7-bit CRC, which is, generated by the CRC computation function 52, and the rate ½ conditional code. The speech coder 50 also outputs 48 class Ib outputs, which are passed to, and protected by, the rate ½ convolutional coder 54. Additionally, the speech coder 50 produces 52 class II bits that are not protected in any way. The class II bits are perceptually the least significant bits used in the system.

The class Ia bits, class Ib bits, the 7-bit CRC, and 5 tail bits, which are used to terminate a trellis, are processed by the rate ½ convolutional coder 54. As will be appreciated by one skilled in the art, a trellis code is a digital communication coding scheme. The rate ½ convolutional coder 54 produces 216 encoded bits from the 108 bit input. The output of the rate ½ convolutional coder 54 is coupled to a puncturing function 56, which punctures (deletes) 8 bits, thereby creating a 208 bit output. The output of the puncturing function 56 and the 52 class II output from the speech coder 50 are coupled to a voice cipher 58. The voice cipher 58 performs data encryption on the 260 bits to create 260 encoded bits. The output of the voice cipher 58 is coupled to the 2-slot interleaver 60, which reorders the encoded bits of two slots in order to randomize any burst errors that may be as seen by the channel decoder. In order to meet system usage and quality of service requirements, there will often be idle time slots where no data communications take place.

Due to advances in technology and other market factors, there is a movement in the digital cellular industry to modify standard IS-136 in order to make use of any idle time slot period. The proposed modification to IS-136 is known generally as the ADVICE system. The ADVICE system allows a cellular base station to transmit auxiliary information (bits) in idle or auxiliary time slot periods. The auxiliary coded information is redundant information that assists certain subscriber units in accurately receiving communications sent from a cellular base station, thereby, resulting in higher voice quality at the subscriber unit.

Although the ADVICE system proposes utilizing unused time slots to transmit auxiliary information, the ADVICE system does not specify any manner in which the auxiliary information is to be generated. Digital communication systems such as cellular systems typically use trellis coding, a process by which each bit that is input into an encoder results in the transmission of multiple coded bits.

Trellis coding is typically implemented using convolutional codes or multiple trellis coded modulation codes. Rate-compatible families of such codes are well known for their suitability in adaptive FEC and automatic repeat request (ARQ) protocols.

Currently, multiple rate codes are typically generated by puncturing a base code. Puncturing a code consists of removing selected coded bits from the transmission stream. For example, a rate ¼ encoder generates four coded bits for each data bit that is to be broadcast. If a certain number of coded bits are deleted, the effective rate of the code becomes higher than ¼. When a communication channel is unfavorable, all coded bits from the base code are transmitted. However, as the channel quality improves, fewer of the encoded bits are transmitted, thereby raising the effective rate of the code. That is, as the channel improves, the puncture rate increases.

One approach to providing the auxiliary information to subscriber units is through traditional concatenated coding schemes. Concatenated coding schemes typically use a high rate BCH or Reed-Solomon codes as an outer code. However, the use of this approach in the ADVICE system would increase subscriber unit complexity because each subscriber unit would require a BCH/Reed-Solomon decoder, which the subscriber units do not presently have, as it is not part of the current IS-136 standard. Additionally, performance issues with concatenated coding include a lack of optimal maximum likelihood decoders and the severe nature of Rayleigh fading channels, which is typical of mobile cellular systems. The implementation of a concatenated coding scheme would require significant changes to the IS-136 coding scheme, thereby adversely affecting backward compatibility. Because the IS-136 standard is used by so many communication systems, it is necessary that the implementation of the ADVICE system maintain backward compatibility with current cellular communication systems.

Once auxiliary information is available to the various subscriber units in a communication system, each subscriber unit must determine when auxiliary information is available for its use. Auxiliary information is always present in an auxiliary time slot, however, that auxiliary information is only useful to a single subscriber unit. Signaling from the cellular base station to the subscriber unit is one way to inform a subscriber unit that useful auxiliary information is available. However, signaling is not desirable because it uses valuable communication bandwidth to transfer the signaling information. Automatic, or autonomous, blind detection of auxiliary information is desirable because signaling overhead is eliminated.

One method of autonomous blind detection is represented in FIG. 2, which shows two stages of decoding that may be used by a particular subscriber unit to detect the presence of useful auxiliary information. The method is based on the assumption that the data transmitted on the auxiliary time slot is from a different trellis encoding of the same information bits as sent on the subscriber unit's primary IS-136 time slot. The received data from the two different encodings (auxiliary and primary time slots) can be decoded together by a single trellis decoder, using for example the Viterbi algorithm. In the first decoding stage a first Viterbi decoder 70 combines information from a time slot dedicated to the subscriber unit and the auxiliary information from an auxiliary time slot (e.g., an ADVICE time slot). The output of the first Viterbi decoder 70 is a decoded bitstream. The bitstream is coupled to a first cyclic redundancy check (CRC) function 72 that performs a CRC on the decoded bitstream. If the bitstream passes the CRC, the subscriber unit concludes that the auxiliary information was intended for its use and outputs the decoded information bits. This conclusion is reliable since the probability that the decoded bit stream will pass the CRC test is extremely low if the auxiliary data were not intended for the subscriber unit.

If the CRC performed by the first CRC function 72 fails, control is passed to a second Viterbi decoder 74. The second Viterbi decoder 74 decodes only the information contained in the dedicated time slot to create a bitstream. The bitstream is coupled from the second Viterbi decoder 74 to a second CRC function 76. The second CRC function 76 performs a CRC on the decoded bit stream. If the decoded bit stream passes the second CRC, the decoded information is output. Otherwise, the subscriber unit decides that the decoded information is incorrect and declares a frame error has occurred.

The two-stage decoding method shown in FIG. 2 clearly requires a significant increase in decoder processing. Accordingly, there is a need for a method of generating and selecting auxiliary data bits to be sent during idle, or auxiliary, time slot periods in the ADVICE communication system. It is necessary that the ADVICE system maintain backward compatibility with current IS-136 systems, while not requiring additional complexity in the subscriber unit. Additionally, there is a need for a method that allows a subscriber unit to autonomously and blindly detect the presence of useful auxiliary information in an auxiliary time slot in an efficient manner.

SUMMARY OF THE INVENTION

The present invention is embodied in a method for use in a receiver in a communication system for determining if useful auxiliary data is available in an auxiliary time slot that is related to a dedicated time slot. The method includes the steps of obtaining auxiliary data related to the auxiliary time slot, obtaining dedicated data related to the dedicated time slot, calculating a metric that compares the auxiliary data to the dedicated data and comparing the metric to a threshold. The method further includes the step of determining whether the auxiliary data is useful auxiliary data based on the comparison between the metric and the threshold.

In some embodiments of the method if the metric exceeds the threshold, the auxiliary data is determined to be useful auxiliary data. Alternatively, in other embodiments if the metric does not exceed the threshold, the auxiliary data is determined to be not useful auxiliary data.

In other embodiments, the threshold is adapted in accordance with a status of the communication link and the threshold can assume one of a plurality of discrete levels, each of the plurality of discrete levels being indicative of a different degree of agreement between the auxiliary data and the auxiliary data.

In some embodiments, the plurality of discrete levels may be modeled by a finite state machine that interrelates the plurality of discrete levels based on operating conditions of the communication link.

In some embodiments, the finite state machine includes an expectant state indicating that the communication link has become poor and the useful auxiliary data are likely to become available to the receiver and an enhanced state indicating that the useful auxiliary data are being and are likely to continue to be received.

The present invention may also be embodied in an apparatus for use in a communication system having a communication link for determining if useful auxiliary data is available in an auxiliary time slot that is related to a dedicated time slot. The apparatus may include a receiver for obtaining auxiliary data related to the auxiliary time slot and for obtaining dedicated data related to the dedicated time slot a computation function for calculating a metric by comparing the auxiliary data to the dedicated data and a threshold comparator for comparing the metric to a threshold and for determining whether the auxiliary data is useful auxiliary data based on the comparison between the metric and the threshold.

In some embodiments the threshold is adapted in accordance with a status of the communication link.

In other embodiments, the threshold can assume one of a plurality of discrete levels, each of the plurality of discrete levels being indicative of a different degree of agreement between the auxiliary data and the auxiliary data.

In certain embodiments, the plurality of discrete levels may be modeled by a finite state machine that interrelates the plurality of discrete levels based on the operating conditions of the communication link.

In some embodiments, the finite state machine may include an expectant state indicating that the communication link has become poor and the useful auxiliary data are likely to become available to the receiver and an enhanced state indicating that the useful auxiliary data are being and are likely to continue to be received.

The invention itself, together with further objects and attendant advantages, will best be understood by reference to the following detailed description, taken in conjunction with the accompanying drawings.

DESCRIPTION OF THE PREFERRED EMBODIMENTS

As previously described, a cellular base station using the ADVICE system is capable of making auxiliary bits available to a particular subscriber unit in an idle, or auxiliary, time slot, which may also be called an ADVICE slot. Due to timing and other cellular system requirements, it has been determined that a given subscriber unit in an IS-136 system has access to up to 100 auxiliary bits in an auxiliary time slot. It has also been determined that up to a full time slot may be available for auxiliary bits in the DTX mode of operation of the IS-136+system. Accordingly, the FEC overlay of the present invention is capable of functioning with either full or partial auxiliary time slots having arbitrary pairings.

Figure 1:
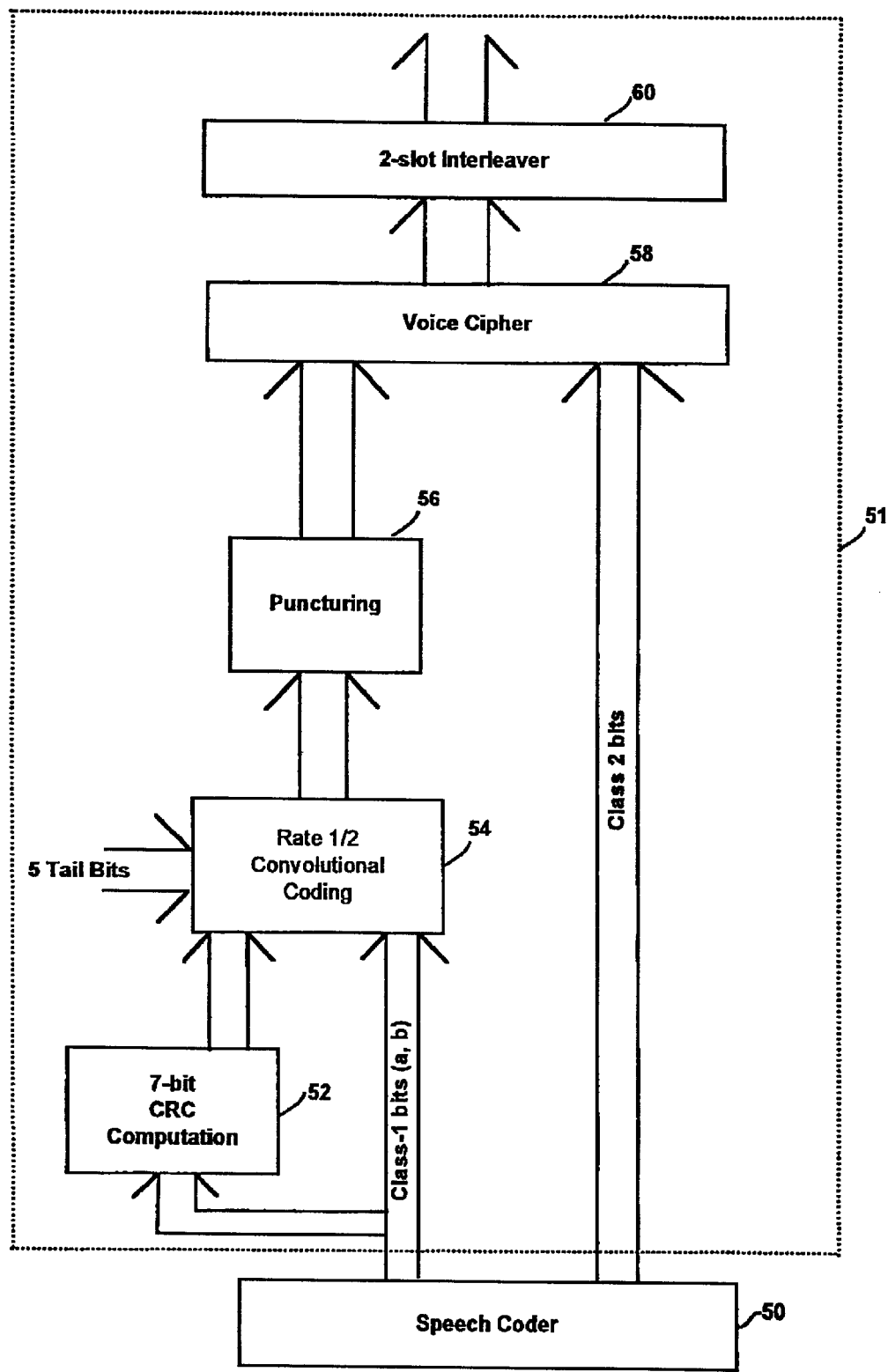
FIG. 1 is a functional block diagram of the forward error correction (FEC) function of an IS-136 TDMA cellular system.
Figure 2:
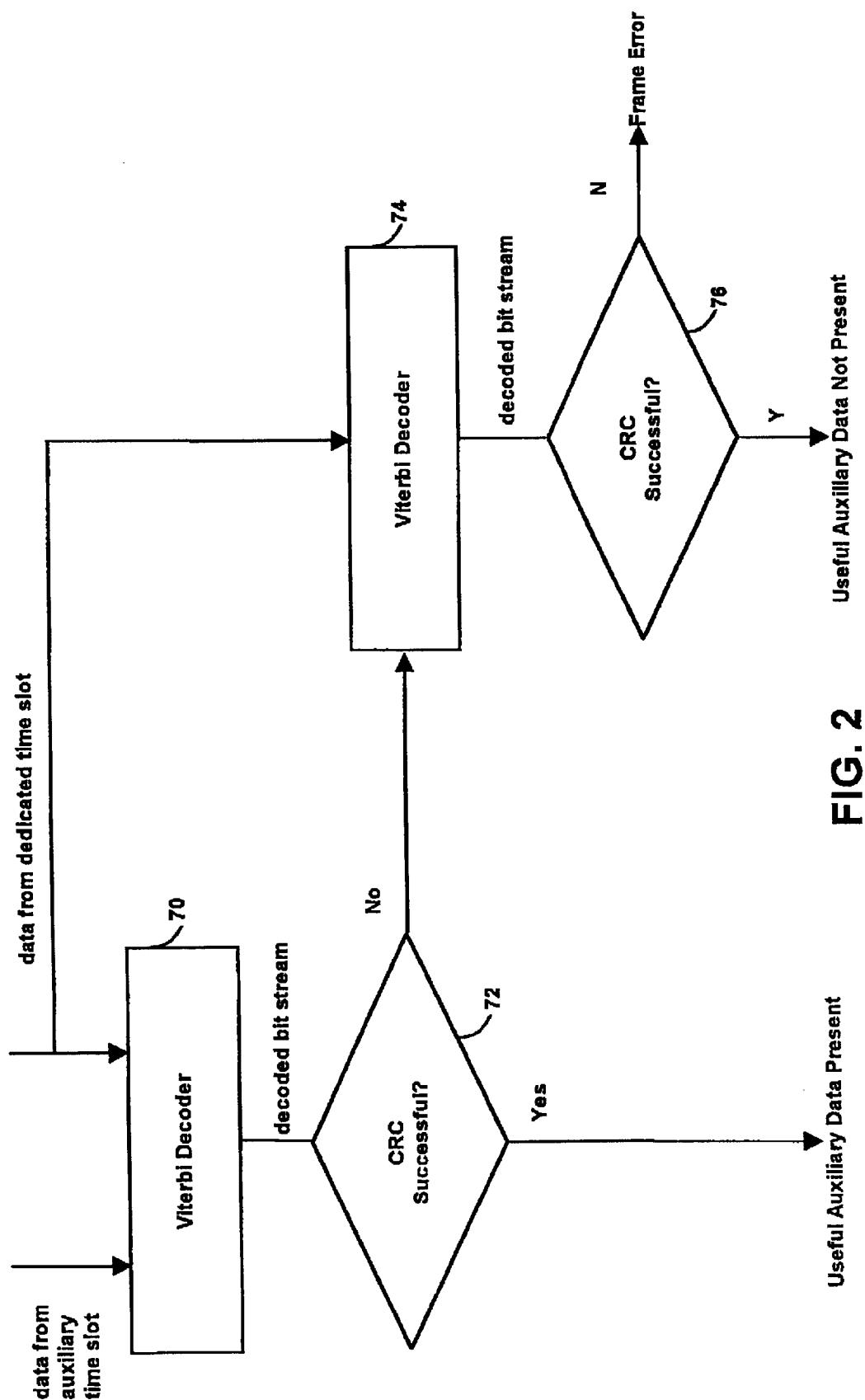
FIG. 2 is a functional block diagram showing two stages of decoding that may be used by a particular subscriber unit to detect the presence of useful auxiliary information.
Figure 3:
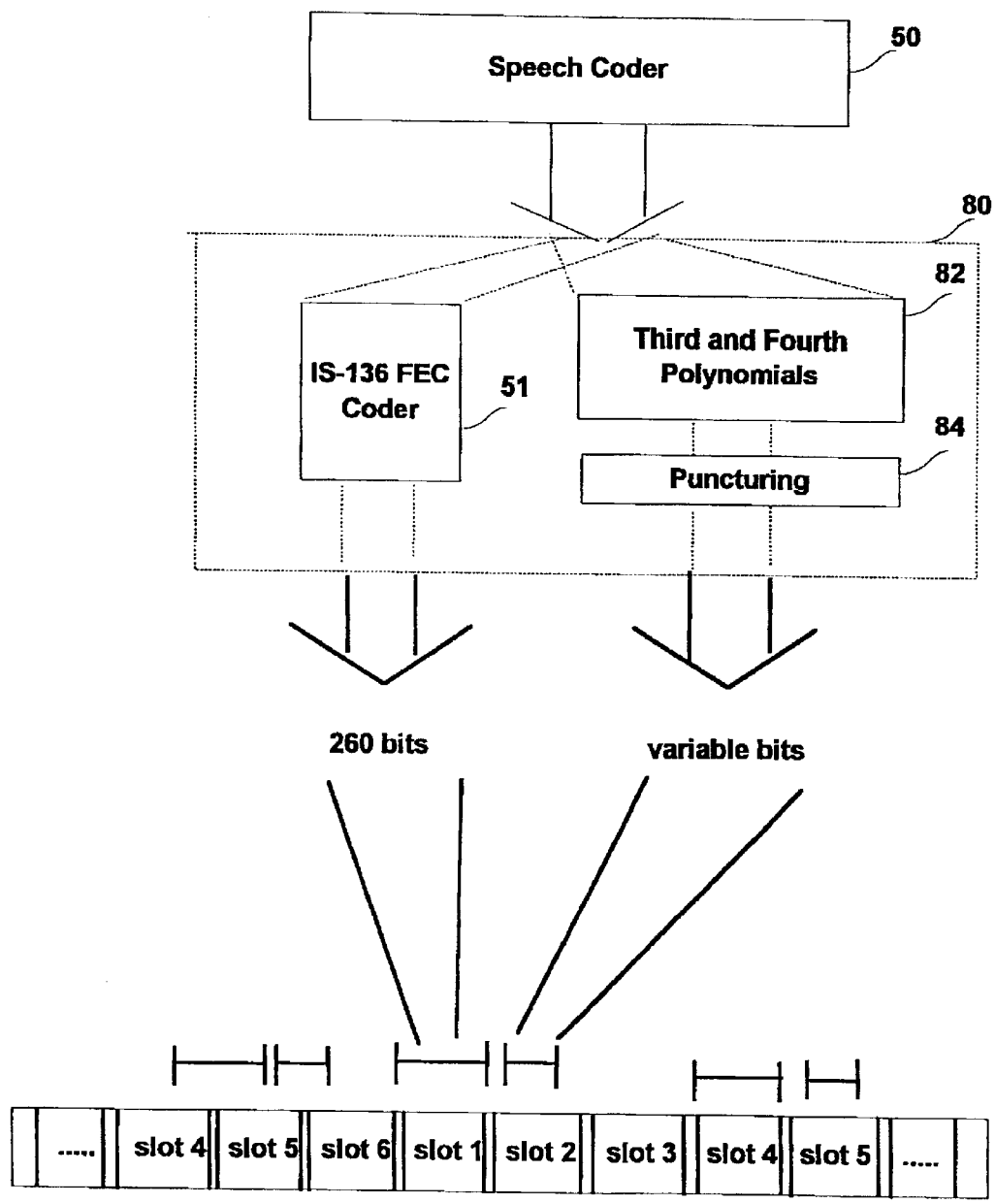
FIG. 3 is an illustration of how the FEC overlay of the present invention would interface with the ADVICE system and IS-136 TDMA time slot structures.

Auxiliary bits must be generated to fill the available auxiliary time slots. FIG. 3 is an illustration of the ADVICE system using the FEC system. The output of the speech coder 50 is coupled to an ADVICE FEC coder 80, which includes an IS-136 FEC coder 51, a third and fourth polynomial generator 82, and a puncturing function 84. The 260 bits generated by the IS-136 FEC coder 51 are used to fill a dedicated time slot (e.g., slot 1) that is allocated to a particular subscriber. This operation is identical to the operation specified by the IS-136 protocol and described in conjunction with FIG. 1. In accordance with the present invention, the third and fourth polynomial generator 82 outputs third and fourth polynomials based on the output of the speech coder 50. The third and fourth polynomial data are passed to the puncturing function 84, which punctures, or deletes, the appropriate number of bits from the polynomial data. The output of the puncturing function 84 is a variable number of auxiliary bits that are used to fill an idle portion of an auxiliary time slot (e.g., slot 2).

Figure 4:
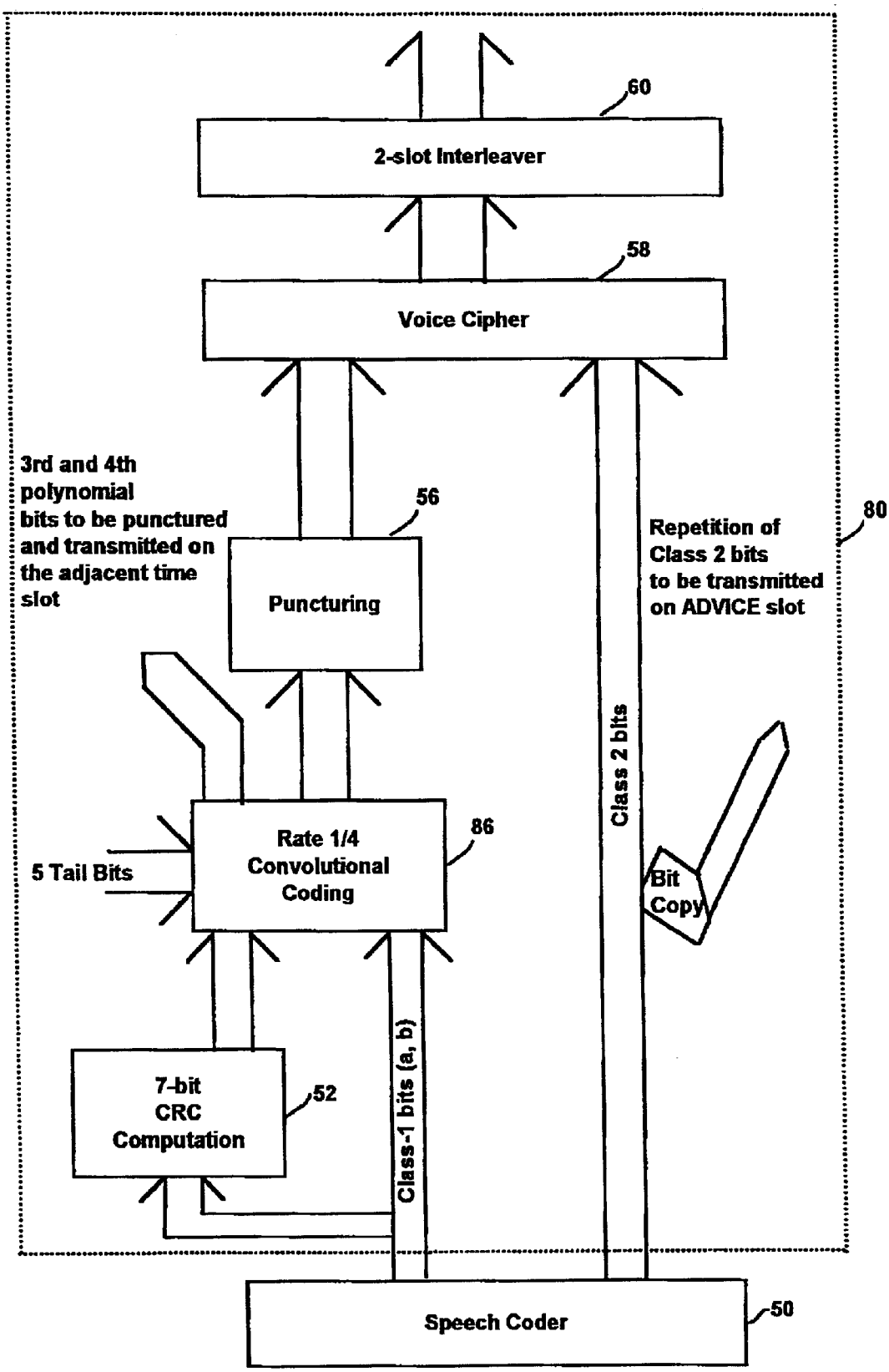
FIG. 4 is a detailed functional block diagram of the FEC overlay proposed for the ADVICE system.

FIG. 4 is an illustration of an ADVICE FEC coder 80 designed in accordance with the teachings of the present invention. The configuration shown in FIG. 4 is identical to the configuration of the conventional IS-136 system shown in FIG. 1, except that the rate ½ convolutional coder 54 is replaced with a rate ¼ convolutional coder 86. The ADVICE FEC coder 80 may also include a transmission control function (not shown) that is connected to the convolutional coder for determining whether to transmit the auxiliary set of coded signals. In accordance with the present invention, the auxiliary bits that are needed to fill the auxiliary time slots are generated using a lower rate convolutional code than is used in the IS-136 system. The rate of the convolutional code may be either ⅓ or ¼, depending on how much of the ADVICE, or auxiliary, slot can be utilized. If only 100 bits are available in an ADVICE slot, then rate ⅓ coding suffices. If a full slot can be used, then rate ¼ coding is desirable. The auxiliary bits are generated by additional connection polynomials, which are added to the IS-136 rate ½ convolutional coder 54. The connection polynomials used by the rate ½ convolutional encoder 54 in the IS-136 system are the optimal constraint length K=6, which is known to those skilled in art. The polynomials shown in equations 1 and 2 represent optimal K=6, rate ½0 connection polynomials.

$$g0(x)=x5+x4+x2+1 \qquad \text{(Equation 1)}$$

$$g1(x)=x5+x3+x2+x+1 \qquad \text{(Equation 2)}$$

In accordance with the present invention, three or four connection polynomials are used to create a rate ⅓ or a rate ¼ coder. Since much less time than a full slot may be available, a rate ⅓ code is created by using three connection polynomials. As is known to those skilled in the art, equations 3–5 show optimal K=6, rate ⅓ covolutional code polynomials.

$$g0(x)=x5+x3+x+1 \qquad \text{(Equation 3)}$$

$$g1(x)=x5+x4+x3+x2+1 \qquad \text{(Equation 4)}$$

$$g2(x)=x5+x2+x+1 \qquad \text{(Equation 5)}$$

Equations 3 and 4 are the reverse polynomials of equations 1 and 2, which are used to generate the rate ½0 code. As is known by those skilled in the art, reverse polynomials generate codes that have the same error event weight distributions. Therefore, since equations one and two are optimal polynomials for rate ½ implementation, a third polynomial, which is the reverse of equation 5, can be added to the standard IS-136 polynomials shown in equations one and two. The resulting polynomials for use in the ADVICE FEC system are shown in equations 6–8.

$$g0(x)=x5+x4+x2+1 \qquad \text{(Equation 6)}$$

$$g1(x)=x5+x3+x2+x+1 \qquad \text{(Equation 7)}$$

$$g2(x)=x5+x4+x3+1 \qquad \text{(Equation 8)}$$

Additionally, a rate ¼ code may be created by adding equation 9 to equations 6–8 to create a set of four connection polynomials.

$$g3(x)=x5+x4+x3+x+1 \qquad \text{(Equation 9)}$$

To keep the auxiliary coded bits equal to the usable payload of the ADVICE time slot, the third polynomial shown in equation 8 is only applied to selected input bits for which protection is desired. Essentially, the lower rate code is punctured in the third and fourth coordinates. The puncturing on the first two coordinates remains the same as specified by the IS-136 specification.

Referring again to FIG. 4, the system of the present invention is shown. The rate ¼ convolutional coder 86 uses polynomials shown in equations 6 and 7 to generate the 216 encoded bits that are coupled to the puncturing function 56. However, the polynomials shown in equations 8 and 9 are used to generate an auxiliary 216 encoded bits that are punctured as necessary and transmitted in an ADVICE slot. The encoded bits are sent across both time slots in such a way that the normal slot is conformant with the IS-136 FEC specifications for backward compatibility.

The puncturing pattern of the 216 encoded auxiliary bits can be chosen to protect any subset of the speech coder 50 output bits, including the currently unprotected class II bits. The more class II bits that are included as input to the rate ¼ coder 86, the heavier the puncturing rate of the ⅓ code will be. Additionally, a copy of the 52 class II bits may be transmitted on the ADVICE, or auxiliary, time slot, as shown in FIG. 4. At least some of the Class II bits should always be transmitted on the auxiliary time slot and the dedicated time slot, in order to allow each subscriber unit to determine if useful auxiliary data is present by combining information received on the dedicated and auxiliary time slots.

A Viterbi decoder receives the bits transmitted by the ADVICE system. Ideally, the normal and ADVICE data are received from both transmissions and used to decode the transmitted bits.

A conventional Viterbi decoder using a rate ½ code ideally computes branch metrics according to equation 10.

$$\mu(\lambda; b) = \sum_{i=1}^{2} |r_i(t_{\lambda,i}) - \alpha_i(t_{\lambda,i}) s_i(b)|^2 \quad \text{(Equation 10)}$$

Where:

$\mu(\lambda;b)$ denotes the branch metric for branch b at trellis stage $\lambda$;

$(r_1(t), r_2(t))$ denotes the received signals at time t corresponding to the transmitted code bits;

$(s_1(b), s_2(b))$ denotes the ideal modulated signals corresponding to the coded bits for branch b;

$\alpha_i(t)$ denotes the channel fade coefficient at time t; and $t\lambda_{,i}$ denotes the transmission time associated with the ith coded bit at the trellis stage $\lambda$.

Note that sampling times $t\lambda_{,i}$ are not necessarily uniformly spaced from one trellis stage to the next, or from one coded bit to the next, due to interleaving.

In accordance with the present invention, equation 11 denotes the ideal branch metrics for the augmented rate ⅓ code.

$$\mu(\lambda; b) = \sum_{i=1}^{3} |r_i(t_{\lambda,i}) - \alpha_i(t_{\lambda,i}) s_i(b)|^2 \quad \text{(Equation 11)}$$

The rest of the Viterbi decoder remains the same, which results in only a modest increase in the decoder complexity of each subscriber unit.

The autonomous, hybrid detection of the presence of useful auxiliary information in an auxiliary time slot is described below. Each of the disclosed embodiments for detecting the presence of useful auxiliary information are based on a comparison between data in a subscriber unit's dedicated time slot and data in an auxiliary time slot. If the data in the dedicated and auxiliary time slots sufficiently agree, the subscriber unit will make the determination that the data in the auxiliary time slot is useful auxiliary data. Accordingly, the subscriber unit will then make use of the data in the auxiliary time slot.

Figure 5:
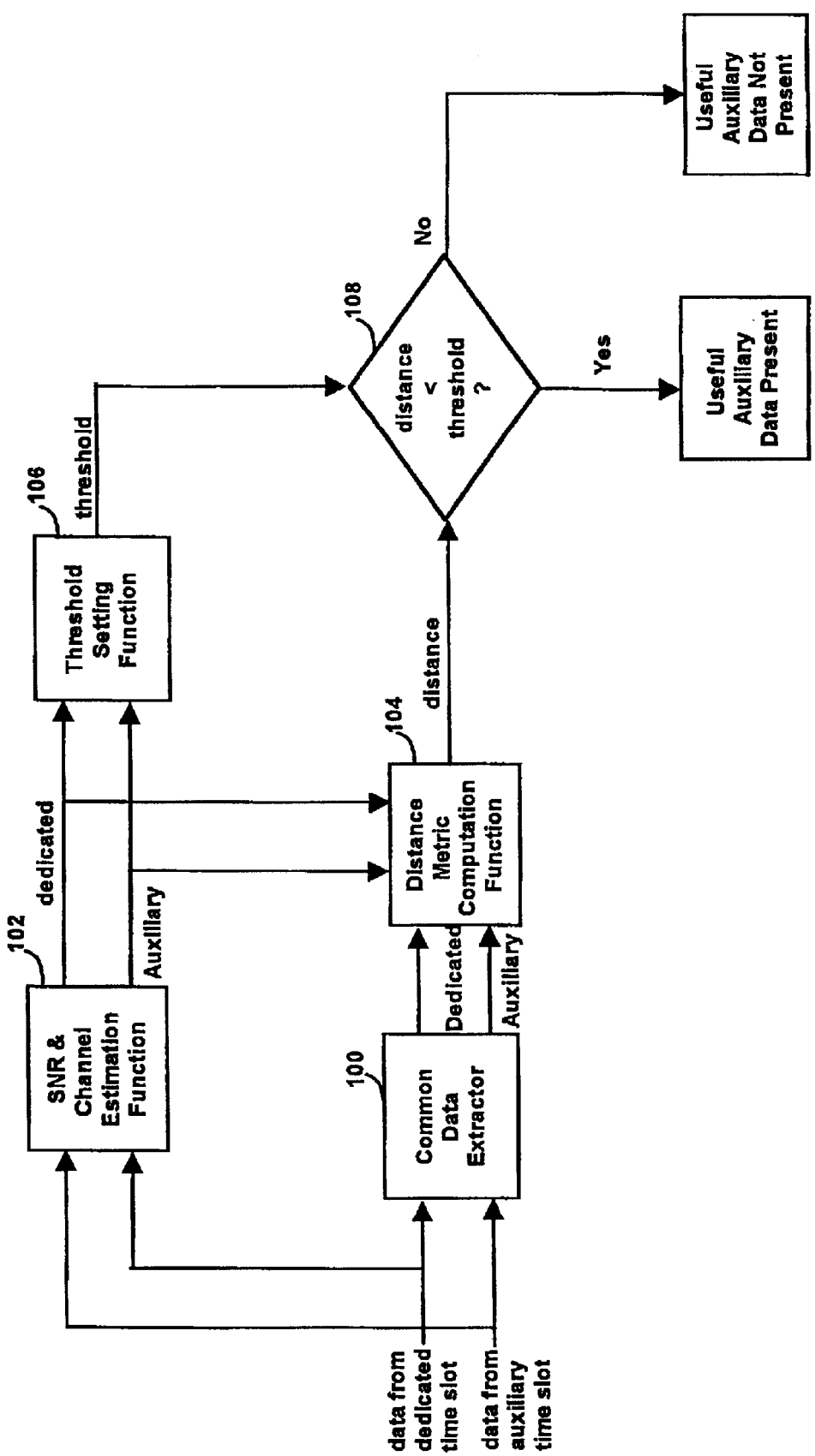
FIG. 5 is a functional representation of an autonomous blind detection method using received data samples and channel estimates, in accordance with the present invention.

FIG. 5 is a functional representation of one embodiment of the present invention that may be used by a subscriber unit for autonomous blind detection of useful auxiliary information using received data samples and channel estimates. The embodiment shown in FIG. 5 includes a common data extractor 100, a signal to noise ratio (SNR) and channel estimation function 102, a distance metric computation function 104, a threshold setting function 106, and a comparator 108. Since the distance metric calculation is based on estimates of the channel fading coefficients, this preferred embodiment is said to make use of channel state information (CSI).

In operation, data from the dedicated subscriber time slot and an auxiliary time slot are coupled to the common data extractor 100. The common data extractor 100 obtains the data from the dedicated and auxiliary time slots that should be common to both time slots. The choice of which bits will be common is made when the system is implemented. For example, as mentioned in connection with FIG. 4, the Class II bits may be broadcast on both the dedicated and auxiliary time slots. Accordingly, the common data extractor 100 would obtain the Class II data from both the dedicated and auxiliary time slots. Data from the dedicated subscriber time slot and an auxiliary time slot are also coupled to the SNR and channel estimation function 102, which determines the signal to noise ratio(SNR) and estimates the fading process of the dedicated time slot and auxiliary time slot.

The distance metric computation function 104 receives the common data from the common data extractor 100 and SNR and channel estimates from the SNR and channel estimation function 102 and produces a distance metric that relates the dedicated time slot information to the auxiliary time slot information. The calculation of the distance metric is predicated on equation 12, which models a complex baseband received signal for the common portions of data received in the dedicated time slot and the auxiliary time slot.

$$r_i(t) = \alpha_i(t) s_i(t) + n_i(t) \quad \text{(Equation 12)}$$

Wherein, $r_i(t)$ represents the signal received by the SNR and channel estimation function 102, $\alpha_i(t)$ represents a fading coefficient, $s_i(t)$ represents the transmitted signal, $n_i(t)$ represents additive white Gaussian noise (AWGN), and subscript i may be equal to 1 or 2, which represent the dedicated time slot and the auxiliary time slot, respectively. $r_i$, $s_i$, and $n_i$ are complex-valued variables but $\alpha_i$ is real-valued. Equation 13 represents the result if L complex samples of $r_i(t)$ are taken at a sampling interval of T.

$$\bar{r}_i = [r_i^I(0), r_i^Q(0), r_i^I(T), r_i^Q(T), \ldots, r_i^I((L-1)T), r_1^Q((L-1)T)] \quad \text{(Equation 13)}$$

Wherein, the superscripts I and Q represent in-phase and quadrature components of the received signal, respectively. Similarly, equations 14 and 15 represent samples of the transmitted signal and the fading coefficient, respectively.

$$\bar{s}_i = [s_i^I(0), s_i^Q(0), s_i^I(T), s_i^Q(T), \ldots, s_i^I((L-1)T), s_1^Q((L-1)T)] \quad \text{(Equation 14)}$$

$$\bar{\alpha}_i = [\alpha_i(0), \alpha_i(T), \ldots, \alpha_i(L-1)T)] \quad \text{(Equation 15)}$$

If $H_0$ represents the hypothesis that auxiliary information is present in the auxiliary time slot, then $\bar{s}_1 = \bar{s}_2$ (i.e., the data transmitted in the dedicated and auxiliary time slots are identical). The alternative hypothesis may be represented as $H_1$, which represents the hypothesis that no auxiliary information is present in the auxiliary time slot or $\bar{s}_1 \neq \bar{s}_2$ (i.e., the data transmitted in the dedicated and auxiliary time slots are not identical). As will be appreciated by one skilled in the art, equation 16 represents the generalized likelihood ratio given by the ratio of conditional probabilities averaged over the unknown signal pairs $(\bar{s}_1, \bar{s}_2)$.

$$\Lambda(\bar{r}_1, \bar{r}_2 | \bar{\alpha}_1, \bar{\alpha}_2) = \frac{\langle P(\bar{r}_1, \bar{r}_2 | \bar{s}_1, \bar{s}_2 \bar{\alpha}_1, \bar{\alpha}_2) \rangle_{s_1 \neq s_2}}{\langle P(\bar{r}_1, \bar{r}_2 | \bar{s}_1, \bar{s}_2 \bar{\alpha}_1, \bar{\alpha}_2) \rangle_{s_1 = s_2}} \quad \text{(Equation 16)}$$

Wherein, P(x|y) is a conditional probability function that represents the probability of event x occurring, given that event y has occurred. Accordingly, assuming equal costs, hypothesis $H_0$ (i.e., the hypothesis that useful auxiliary information is present in the auxiliary time slot)will be accepted when the result of equation 16 is less than or equal to 1. As will be appreciated by those skilled in the art, because the conditional probability density functions are Gaussian, equation 17 holds.

$$P(\bar{r}_1, \bar{r}_2 | \bar{s}_1, \bar{s}_2 \bar{\alpha}_1, \bar{\alpha}_2) = \quad \text{(Equation 17)}$$

$$C \cdot \exp\left\{-\frac{1}{2\sigma^2} \sum_k [r_1(kT) - \alpha_1(kT)s_1(kT)]^2\right\} \cdot$$

$$\exp\left\{-\frac{1}{2\sigma^2} \sum_k [r_2(kT) - \alpha_2(kT)s_2(kT)]^2\right\}$$

Appropriate substitution of equation 17 into equation 16 yields an equation that having dominant terms in the numerator and the denominator according to equations 18 and 19, respectively.

$$\exp\left\{-\frac{1}{\sigma^2} \sum_k \sum_{i=1}^{2} \left[|r_i^I(kT)\alpha_i(kT)| + |r_i^Q(kT)\alpha_i(kT)|\right]\right\} \quad \text{(Equation 18)}$$

$$\exp\left\{-\frac{1}{\sigma^2} \sum_k \left[\left|\sum_{i=1}^{2} r_i^I(kT)\alpha_i(kT)\right| + \left|\sum_{i=1}^{2} r_i^Q(kT)\alpha_i(kT)\right|\right]\right\} \quad \text{(Equation 19)}$$

Accordingly, after taking logarithms, the approximate maximum likelihood test that has a distance-like measurement, as shown in equation 20.

$$D = \sum_{k=0}^{L-1} \left\{ \left| \sum_{i=1}^{2} |r_i^I(kT)\alpha_i(kT)| - \left|\sum_{i=1}^{2} r_i^I(kT)\alpha_i(kT)\right| \right| + \right. \quad \text{(Equation 20)}$$

$$\left. \left| \sum_{i=1}^{2} |r_i^Q(kT)\alpha_i(kT)| - \left|\sum_{i=1}^{2} r_i^Q(kT)\alpha_i(kT)\right| \right| \right\}$$

The distance metric shown in equation 20 that is calculated by the distance metric computation function 104, shown in FIG. 5. This distance metric uses channel state information. As shown in FIG. 8, the distance metric (D) is compared to a threshold by the comparator 108. The threshold, which may be represented by λ, is generated by the threshold setting function 106. In a preferred embodiment, the threshold is a function of the effective SNR after fading is considered, because a constant false alarm rate (CFAR) for the detection of useful auxiliary data is desirable. Ideally the receiver will have a constant rate of false indications that useful auxiliary information is available in an auxiliary time slot. In the absence of noise, the in-phase components of equation 20 have a minimum value of 0 and a maximum value of $2\sqrt{E_b} \min\{\alpha_1^2(kT), \alpha_2^2(kT)\}$. With noise and a high SNR, the standard deviation of the maximum value of the in-phase components is $2\sigma$.

Accordingly, to achieve a CFAR operation, the threshold λ should be set according to equation 21.

$$\lambda = \mu \sqrt{\widehat{SNR}} \sum_{k=0}^{L-1} \min\{\hat{\alpha}_1^2(kT), \hat{\alpha}_2^2(kT)\} \quad \text{(Equation 21)}$$

Wherein, $\mu$ is a constant multiplier selected to meet desired operating points with respect to missed detection and false alarm rates and $\hat{\alpha}_i$ and $\widehat{SNR}$ are the receiver's best estimates of channel fading and SNR, which are provided by the SNR and channel estimation function 102.

The comparator 108 compares the distance metric (D) with the threshold λ. If the distance metric is above the threshold, the receiver determines that useful auxiliary information is not present. Conversely, if the distance metric is below the threshold, the receiver determines that useful auxiliary information is present in the auxiliary time slot.

Figure 6:
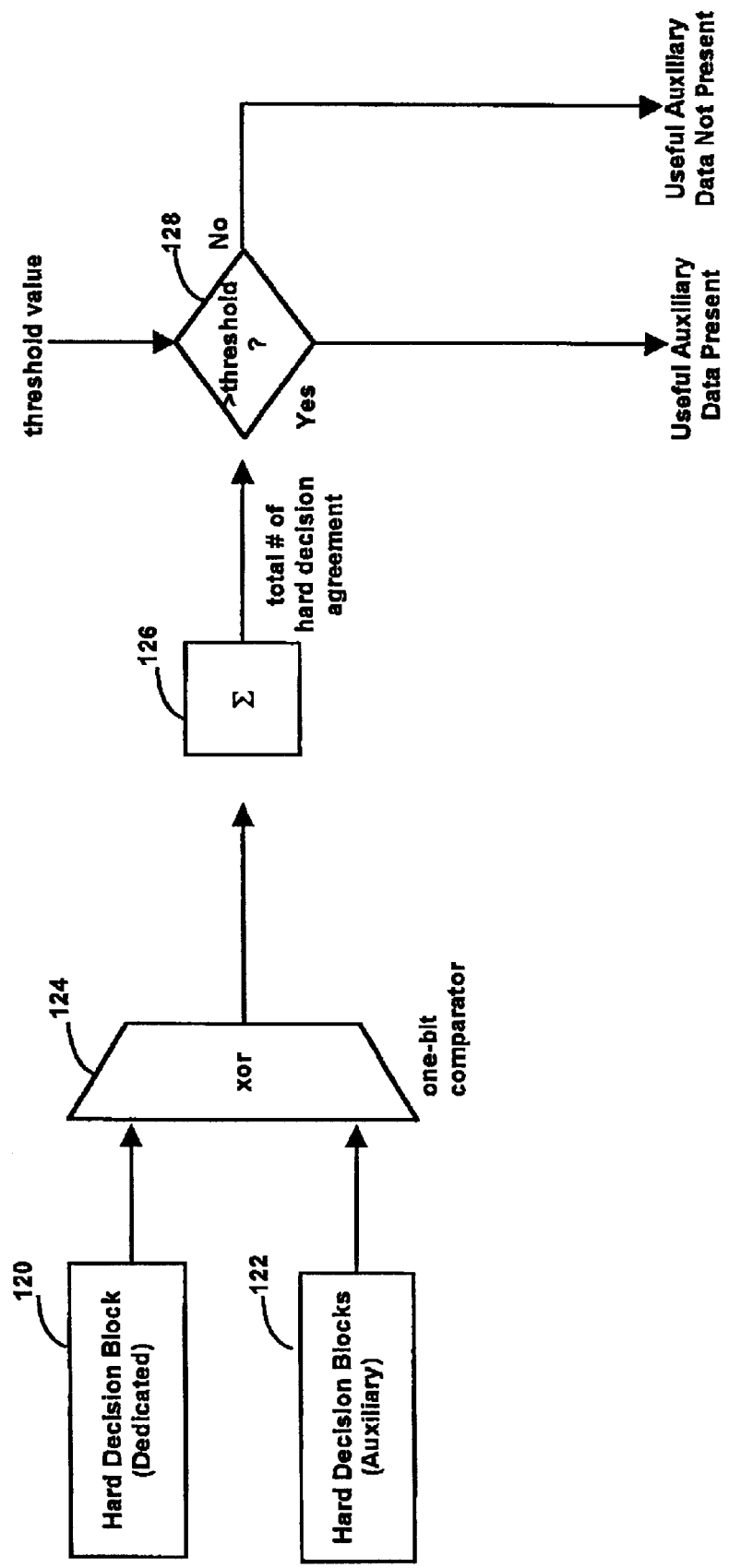
FIG. 6 is a functional representation of an autonomous blind detection method using Hamming distance, in accordance with the present invention.

An alternative approach to determining if useful auxiliary information is present in an auxiliary time slot is shown in FIG. 6. Information received by a subscriber unit in the subscriber unit's dedicated time slot and the information received in an auxiliary time slot are passed through hard decision blocks 120 and 122, respectively. The hard decision blocks 120 and 122 quantize each received data sample into two levels of received binary information bits. For example, as shown in FIG. 4 the 52 Class II bits may be repeated on an auxiliary time slot. The bits representative of the dedicated time slot and the auxiliary time slot are coupled from the hard decision blocks 120, 122 to a one-bit comparator function 124. The one-bit comparator function may be embodied in a digital logic gate such as a time-input exclusive-OR (XOR) gate. As will be appreciated by one skilled in the art, an XOR gate produces a "high" output when its inputs do not match, and outputs a "low" when its inputs match. If the Class II bits are repeated on the auxiliary time slot, a comparison between the dedicated time slot and the auxiliary time slot will yield repeated outputs from the comparator function that indicate the input bits (i.e., the bits from the dedicated and auxiliary time slots) match.

The output of the comparator function 124 is coupled to a counter 126, which increments each time it receives an indication that two bits being compared by the comparator function 124 are identical. The counter 126 totals the number of agreements between the data in the dedicated time slot and the auxiliary time slot. A comparator 128 compares the output of the counter 126 to a threshold and, based on the results of the comparison, decides whether useful auxiliary information is available the subscriber unit. If the total number of agreements from the counter 126 is greater than the threshold value, the subscriber unit decides that useful auxiliary information is present in an auxiliary time slot. Alternatively, if the output of the counter is less than the useful threshold, the subscriber unit determines that auxiliary information is not available for use by the subscriber unit.

The threshold that is selected as a reference may simply have a nominal value or may have a dynamic value based on the state of the subscriber unit. For example, if the 52 Class II bits are broadcast in an auxiliary time slot, a nominal threshold of 35 agreements between the data in the dedicated and the auxiliary time slots may be specified. Of the 52 Class II bits, if the number of agreements between the auxiliary time slot and the dedicated time slot data is greater than 35, the subscriber unit will decide that useful auxiliary information is available. Increasing the threshold to a higher level will reduce the number of false detections of the presence of useful auxiliary data and will increase the number of times that the presence of useful auxiliary data is missed by the subscriber unit.

Figure 7:
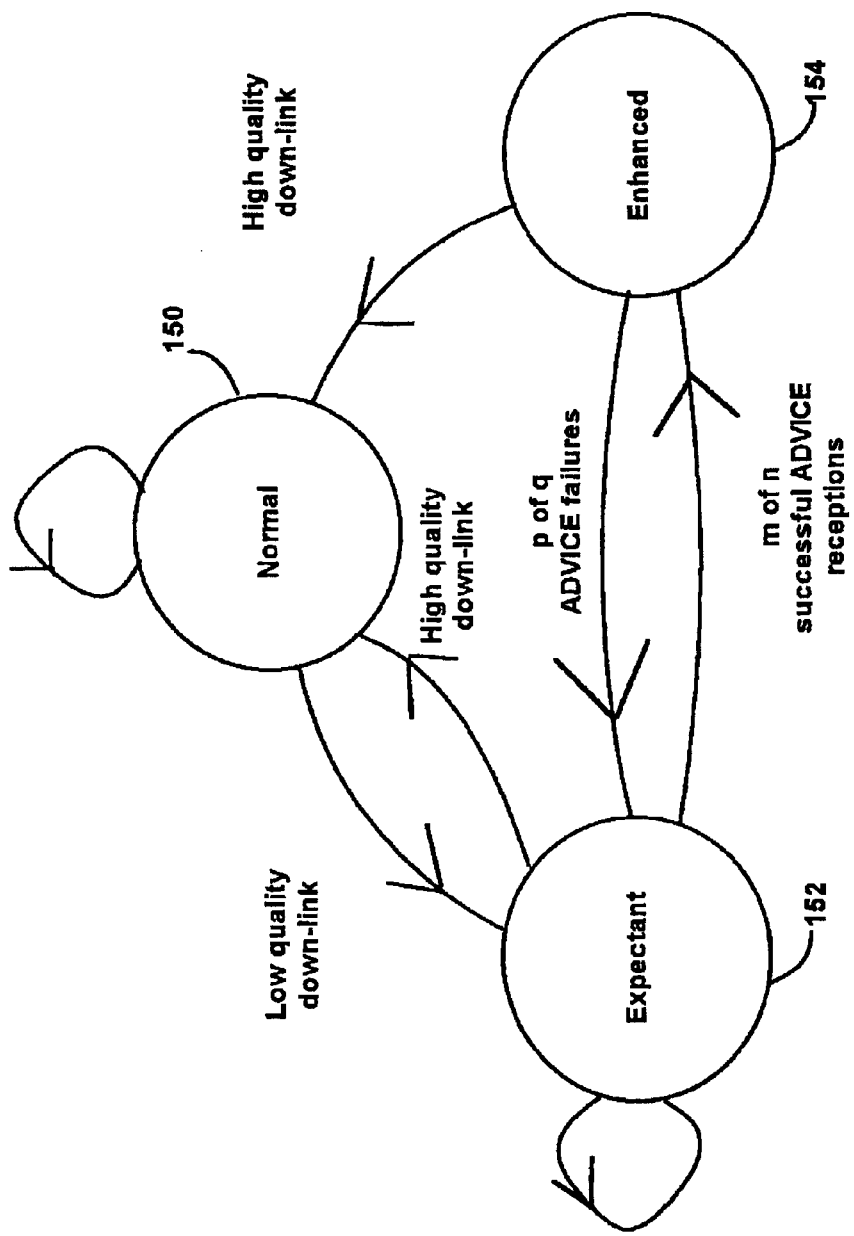
FIG. 7 is a state transition diagram representation of a method used to regulate a threshold value in accordance with autonomous blind detection method using Hamming distance shown in FIG. 6.

As noted, the threshold may be dynamic and adaptive. A finite state machine (FSM) allows the subscriber unit to set a high detection threshold for initial determination of useful auxiliary data and a lower threshold once useful auxiliary data is determined to be present. Once such FSM is shown in FIG. 7. While the FSM shown has only three states, it should be noted that many different states may be added to a FSM in keeping with the teaching of the present invention. The three states shown in the FSM of FIG. 7 are normal 150, expectant 152, and enhanced 154. A subscriber unit begins operation in the normal state 150. While the channel on which the subscriber unit is operating is favorable, the subscriber unit has no expectation that auxiliary information is present and, accordingly, does not look for such information. However, when channel quality begins to deteriorate, the subscriber unit may expect the base station with which it is communicating to begin providing auxiliary information in auxiliary time slots. At this point the subscriber unit switches into the expectant state 152, which has a high threshold (e.g., 39 ), and begins searching for useful auxiliary information in auxiliary time slots. The expectant threshold is set high to keep the number of false detections of useful auxiliary information to a minimum.

Once useful auxiliary information is detected (i.e., the threshold is crossed), the subscriber unit utilizes the auxiliary information to enhance system performance. When auxiliary information is being used, the subscriber unit switches into an enhanced state of operation 154. The enhanced state 154 has a lower threshold (e.g., 35 ) than the expectant state 152 because the subscriber unit is already receiving useful auxiliary information and wishes to maintain detection of the information. If at any time the subscriber unit detects an increase in the quality level of the channel, it will return to the normal state 150 of operation wherein it is not looking for auxiliary information.

Of course, it should be understood that a range of changes and modifications can be made to the preferred embodiment described above. Different distance metrics could be used instead of the metric of equation 20 or the Hamming distance between the vectors of received primary and auxiliary data. Important example would include the Euclidean distance between the vectors of received primary and auxiliary data as well as the complex inner product between the two vectors. If necessary, these metrics would first correct for known or estimated channel distortions. Furthermore, any monotonic function (linear or nonlinear) of a distance metric would also serve as another useful metric. The channel fade coefficient is usually not known in the receiver. Accordingly, the receiver may form an estimate of the fade coefficient and use the estimate in the branch metric calculations or may ignore the fade coefficient all together.

Additionally, the present invention is flexible with respect to the actual number of auxiliary bits available to the receiver. Given appropriate signaling between the base station and the subscriber unit, the number of auxiliary bits available to a subscriber unit can be dynamic. For example, the ADVICE system could allocate 25 bits of an available slot to one subscriber unit and a subsequent 25 bits to another subscriber unit. Furthermore, although the foregoing explanation is given with respect to audio or voice, the present invention may be utilized in any application in need of unequal error protection of data (e.g., video). It is therefore intended that the foregoing detailed description be regarded as illustrative rather than limiting and that it be understood that it is the following claims, including all equivalents, which are intended to define the scope of this invention.

What is claimed is:

1. In a communication system having a communication link, a method for use in a receiver for determining if useful auxiliary data is available in an auxiliary time slot that is related to a dedicated time slot, comprising the steps of:
   obtaining auxiliary data related to said auxiliary time slot;
   obtaining dedicated data related to said dedicated time slot;
   calculating a metric that compares said auxiliary data to said dedicated data;
   comparing said metric to a threshold; and
   determining whether said auxiliary data is useful auxiliary data based on the comparison between said metric and said threshold.

2. The method of claim 1, wherein common data are in both said dedicated time slot and said auxiliary time slot.

3. The method of claim 2, wherein said common data are in known positions within said dedicated time slot and said auxiliary time slot.

4. The method of claim 1, wherein if said metric exceeds said threshold, said auxiliary data is determined to be useful auxiliary data.

5. The method of claim 1, wherein if said metric does not exceed said threshold, said auxiliary data is determined to be not useful auxiliary data.

6. The method of claim 5, wherein said threshold is adapted in accordance with a status of said communication link.

7. The method of claim 6, wherein said threshold assumes one of a plurality of discrete levels, each of said plurality of discrete levels being indicative of a different degree of agreement between said auxiliary data and said auxiliary data.

8. The method of claim 7, wherein said plurality of discrete levels are modeled by a finite state machine that interrelates said plurality of discrete levels based on operating conditions of said communication link.

9. The method of claim 8, wherein said operating conditions are used to determine an expectation that said receiver should be receiving useful auxiliary data.

10. The method of claim 8, wherein said finite state machine comprises:
   (a) an expectant state indicating that said communication link has become poor and said useful auxiliary data are likely to become available to said receiver; and
   (b) an enhanced state indicating that said useful auxiliary data are being and are likely to continue to be received.

11. The method of claim 10, wherein said receiver sets the threshold consistent with a high level of confidence in the availability of said useful auxiliary data when in said expectant state.

12. The method of claim 10, wherein said receiver sets the threshold consistent with a low level of confidence in the availability of said useful auxiliary data when in said enhanced state.

13. The method of claim 1, wherein said step of calculating a metric comprises calculating a distance metric.

14. The method of claim 13, further comprising the step of creating estimates representing an effect of channel fading on said dedicated data and said auxiliary data, wherein said estimates are referred to as channel state information.

15. The method of claim 14, further comprising the step of calculating a channel metric related to the channel on which said auxiliary data and said dedicated data are broadcast.

16. The method of claim 14, wherein the calculation of said metric includes the use of said channel state information.

17. The method of claim 14, further comprising the step of calculating said threshold based on said channel state information.

18. The method of claim 17, wherein said distance metric is computed as a Euclidean distance between an auxiliary data vector and a dedicated data vector and is as corrected based on said channel state information.

19. The method of claim 1, wherein said step of calculating a metric comprises bit-wise comparing said auxiliary data to said dedicated data and determining a total number of bits on which said auxiliary data matches said dedicated data.

20. The method of claim 19, wherein said bit-wise comparing comprises an exclusive-OR function.

21. The method of claim 19, wherein said threshold is adaptive to channel characteristics.

22. The method of claim 19, wherein said threshold specifies a number of matches between said auxiliary data and said dedicated data.

23. In a communication system having a communication link, an apparatus for determining if useful auxiliary data is available in an auxiliary time slot that is related to a dedicated time slot, comprising:
   a receiver for obtaining auxiliary data related to said auxiliary time slot and for obtaining dedicated data related to said dedicated time slot;
   a computation function for calculating a metric by comparing said auxiliary data to said dedicated data; and
   a threshold comparator for comparing said metric to a threshold and for determining whether said auxiliary data is useful auxiliary data based on the comparison between said metric and said threshold.

24. The apparatus of claim 23, wherein common data are in both of said dedicated time slot and said auxiliary time slot.

25. The apparatus of claim 24, wherein said common data are in known positions within said dedicated time slot and said auxiliary time slot.

26. The apparatus of claim 23, wherein if said metric exceeds said threshold, said auxiliary data is determined to be useful auxiliary data.

27. The apparatus of claim 23, wherein if said metric does not exceed said threshold, said auxiliary data is determined to be not useful auxiliary data.

28. The apparatus of claim 27, wherein said threshold is adapted in accordance with a status of said communication link.

29. The apparatus of claim 28, wherein said threshold assumes one of a plurality of discrete levels, each of said plurality of discrete levels being indicative of a different degree of agreement between said auxiliary data and said auxiliary data.

30. The apparatus of claim 29, wherein said plurality of discrete levels are modeled by a finite state machine that interrelates said plurality of discrete levels based on operating conditions of said communication link.

31. The apparatus of claim 30, wherein said operating conditions are used to determine an expectation that said receiver should be receiving useful auxiliary data.

32. The apparatus of claim 30, wherein said finite state machine comprises:
   (a) an expectant state indicating that said communication link has become poor and said useful auxiliary data are likely to become available to said receiver; and
   (b) an enhanced state indicating that said useful auxiliary data are being and are likely to continue to be received.

33. The apparatus of claim 32, wherein said receiver sets the threshold consistent with a high level of confidence in the availability of said useful auxiliary data when in said expectant state.

34. The apparatus of claim 32, wherein said receiver sets the threshold consistent with a low level of confidence in the availability of said useful auxiliary data when in said enhanced state.

35. The apparatus of claim 23, wherein said metric comprises calculating a distance metric.

36. The apparatus of claim 35, further comprising a channel estimation function that creates estimates representing an effect of channel fading on said dedicated data and said auxiliary data, wherein said estimates are referred to as channel state information.

37. The apparatus of claim 36, wherein said metric is related to the channel on which said auxiliary data and said dedicated data are broadcast.

38. The apparatus of claim 36, wherein the calculation of the metric includes the use of said channel state information.

39. The apparatus of claim 36, wherein said threshold is based on said channel state information.

40. The apparatus of claim 39, wherein said distance metric is computed as a Euclidean distance between an auxiliary data vector and a dedicated data vector and is as corrected based on said channel state information.

41. The apparatus of claim 23, wherein said metric comprises bit-wise comparison between said auxiliary data and said dedicated data to determine a total number of bits on which said auxiliary data matches said dedicated data.

42. The apparatus of claim 41, wherein said bit-wise comparing comprises an exclusive-OR function.

43. The apparatus of claim 41, wherein said threshold is adaptive to channel characteristics.

44. The apparatus of claim 41, wherein said threshold specifies a number of matches between said auxiliary data and said dedicated data.

* * * * *